United States Patent
Wartmann

(10) Patent No.: US 10,054,779 B2
(45) Date of Patent: Aug. 21, 2018

(54) APOCHROMATIC MICROSCOPE OBJECTIVE

(71) Applicant: Carl Zeiss Microscopy GmbH, Jena (DE)

(72) Inventor: Rolf Wartmann, Waake (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/615,613

(22) Filed: Feb. 6, 2015

(65) Prior Publication Data
US 2015/0248001 A1    Sep. 3, 2015

(30) Foreign Application Priority Data
Mar. 1, 2014   (DE) .................. 10 2014 003 192

(51) Int. Cl.
*G02B 21/02* (2006.01)
*G02B 13/14* (2006.01)
*G02B 27/00* (2006.01)
*G02B 9/62* (2006.01)

(52) U.S. Cl.
CPC ........... *G02B 21/02* (2013.01); *G02B 13/143* (2013.01); *G02B 27/0025* (2013.01); *G02B 9/62* (2013.01)

(58) Field of Classification Search
CPC ....... G02B 21/02; G02B 13/146; G02B 21/33
USPC ........................................ 359/656–661, 716
See application file for complete search history.

(56) References Cited

U.S. PATENT DOCUMENTS

| 4,110,006 A * | 8/1978 | Ikemori ............... G02B 15/173 359/684 |
| 2005/0207021 A1* | 9/2005 | Yamaguchi ........... G02B 21/33 359/658 |
| 2013/0003187 A1* | 1/2013 | Wartmann ............ G02B 21/33 359/656 |
| 2013/0100537 A1* | 4/2013 | Matthae ............... G02B 27/005 359/656 |

FOREIGN PATENT DOCUMENTS

| DE | 102009037743 | 2/2011 |
| DE | 102011116757 | 4/2013 |
| DE | 2012016698 | 3/2014 |

OTHER PUBLICATIONS

German Search Report for German Application No. DE102014003192.6, dated Jun. 12, 2014. English translation provided.

* cited by examiner

*Primary Examiner* — Darryl J Collins
*Assistant Examiner* — Journey Sumlar
(74) *Attorney, Agent, or Firm* — Patterson Thuente Pedersen P.A.

(57) ABSTRACT

An apochromatic microscope objective, including three optical sub-systems, wherein starting from the object plane, the first sub-system includes a meniscus and a convergent lens, wherein the meniscus is curved towards the object plane, the second sub-system is made up of three elements, wherein a first element includes a meniscus or a cemented element, a second element is configured as a collecting cemented element and a third element is a cemented element, and wherein either the first element or the third element is strongly scattering and the third sub-system has at least one cemented element with a collecting lens.

14 Claims, 2 Drawing Sheets

APOCHROMATIC MICROSCOPE OBJECTIVE

RELATED APPLICATION

The present application claims priority to German Application No. 10 2014 003 192.6 filed Mar. 1, 2014, said priority application being incorporated herein in its entirety by reference.

FIELD OF THE INVENTION

The invention relates to an apochromatic microscope objective for high-resolution chromatic broadband microscopy applications, in particular with digital imaging.

BACKGROUND OF THE INVENTION

Overview objectives are known which are typically used in visual observation. They are generally corrected only for the visual spectrum and do not have high numerical apertures. Achromatic or semi-apochromatic objectives 5x/0.13 up to a maximum of 5x/0.25 are, for example, customary. Higher apertures lead to a higher resolving power and this cannot be resolved by the human eye. Likewise, good correction in the ultraviolet (UV) range or in the infrared (IR) range is not necessary, because the eye is blind in these ranges.

This situation is changing increasingly with the increasing trend towards digital microscopy. Digital microscopes are capable of resolving substantially more details than the human eye. This generally takes place with the aid of high-resolution cameras, or with the aid of optical secondary magnification systems. Also with regard to the usable wavelength spectrum digital imaging systems are advantageous. Due to these advantages by comparison with the human eye, even with the overview objectives there is a repeated requirement for high-aperture systems to be made available with a large chromatic bandwidth.

Therefore an object of embodiments of the invention is to provide a 380 nm to 900 nm apochromatic micro-objective which has a numerical aperture from 0.36 to 0.4 and an object field of 4.4 mm and which exhibits a sufficiently good transparency up to a wavelength of 340 nm.

According to embodiments of the invention, the microscope objective comprises three optical sub-systems, wherein starting from the object plane
  the first sub-system includes a meniscus and a convergent lens, wherein the meniscus is curved towards the object plane,
  the second sub-system is made up of three elements, wherein a first element consists of a meniscus or a cemented element,
  a second element is configured as a collecting cemented element and
  a third element includes a cemented element,
  wherein either the first element or the third element is designed to be strongly scattering and
  the third sub-system has at least one cemented element with a collecting lens.
The convergent lens of the first sub-system is advantageously made of a Fluorkron glass.

Furthermore it is advantageous if the first element of the second sub-system as meniscus is made of a highly refractive lanthanum glass or of a cemented element having at least one lens made of a short flint glass.

The second element of the second sub-system advantageously consists of a convergent lens made of Fluorkron glass or $CaF_2$ and a diverging lens made of a highly refractive lanthanum or short flint glass.

Likewise it is advantageous that the cemented element of the third element of the second sub-system has a lens made of a lanthanum glass and a convergent lens of the third sub-system is made of Fluorkron glass or $CaF_2$.

BRIEF DESCRIPTION OF THE DRAWINGS

The microscope objective according to embodiments of the invention will be explained in greater detail below with reference to embodiments. In the drawings.

DETAILED DESCRIPTION

Figure 1:
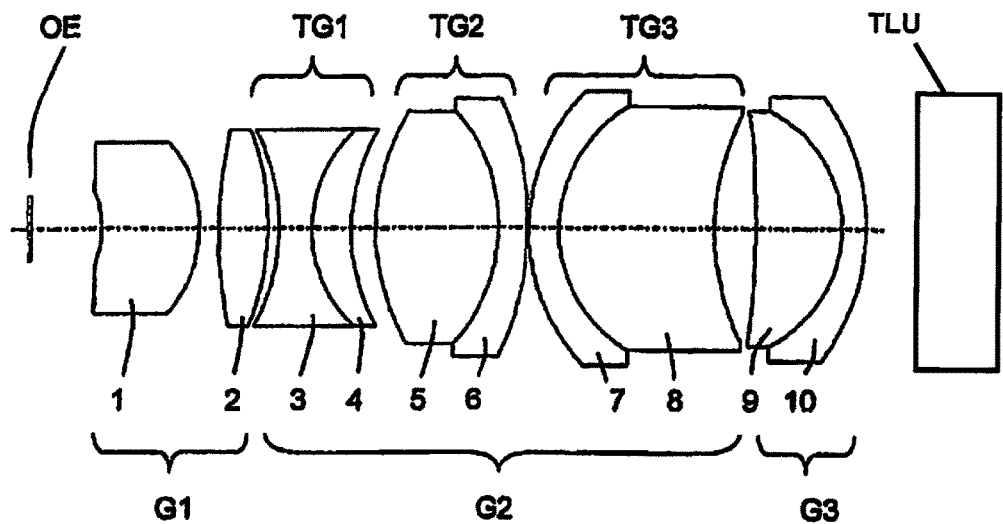
FIG. 1 shows a schematic representation of the sub-systems according to a first embodiment.

FIG. 1 shows the lens arrangement of the three optical sub-systems according to a first embodiment, viewed from the object plane OE with the sub-systems G1, G2 and G3, wherein the sub-system 2 consists of the elements TG1, TG2, and TG3.

The first sub-system G1 consists of a meniscus 1 and a convergent lens 2, wherein the meniscus 1 is curved towards the object plane OE.

The second sub-system G2 consists of three elements TG1, TG2, and TG3, wherein the first, strongly scattering element TG1 is characterized by a cemented element comprising the lenses 3 and 4 and at least one of the lenses 3 or 4 is made of a short flint glass.

The second convergent element of the second sub-system TG2 is designed as a cemented element consisting of a convergent lens 5 made of Fluorkron glass or $CaF_2$ and a diverging lens 6 made of a highly refractive lanthanum or short flint glass. Furthermore the third element TG3 of the second sub-system G2 consists of a cemented element comprising the lenses 7 and 8, wherein the lens 8 is made of Fluorkron glass or $CaF_2$.

Figure 2:
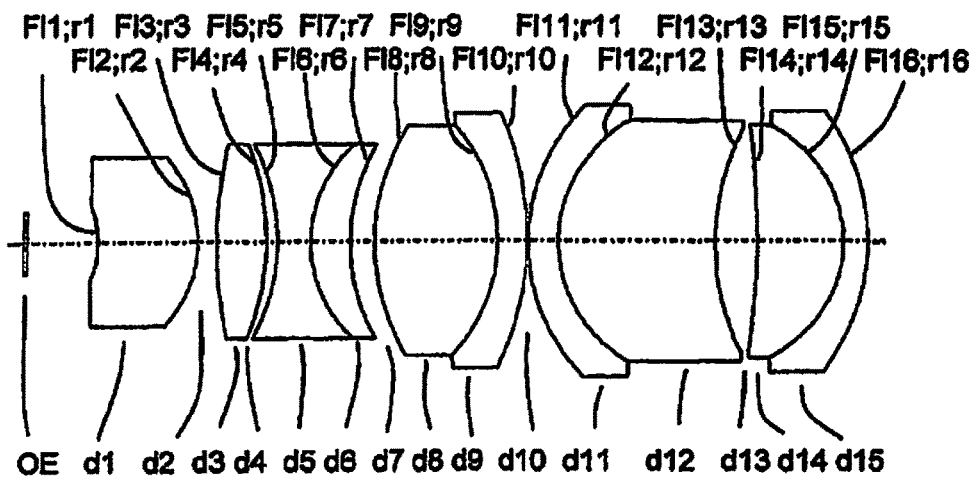
FIG. 2 shows a representation of the microscope objective according to FIG. 1 with the design data references for the thicknesses or air gaps as well as the radii and areas of the individual lenses.

The third sub-system G3 is characterized by a cemented element comprising the lenses 9 and 10, wherein the lens 10 is made of a lanthanum glass. The thicknesses or the air gaps d1 to d15, the radii of curvature r1 to r16 and the areas F11 to FL16 of the individual lenses 1 to 10 are indicated in FIG. 2.

The following table shows the first embodiment with the radii of curvature r1 to r16 in mm, the thicknesses or air gaps d1 to d15 in mm, the refractive indices ne, the Abbe numbers $v_e$ at a magnification of 5.88, a numerical aperture of 0.4, a cover glass thickness of 0.17 mm, a working distance of 5.84 mm and an image diameter of 26.00 mm:

| Area FL | Radii of curvature r1-r16 (mm) | Thickness d1-d15 (mm) | Refractive index $n_e$ | Abbe number $v_e$ |
|---|---|---|---|---|
| 1 | −7.717 | 7.970 | 1.88815 | 40.52 |
| 2 | −10.745 | 1.507 | | |
| 3 | 38.680 | 3.960 | 1.59446 | 68.00 |
| 4 | −22.386 | 0.920 | | |
| 5 | −17.277 | 2.700 | 1.62033 | 63.10 |
| 6 | 10.984 | 3.200 | 1.72539 | 34.47 |
| 7 | 15.962 | 2.020 | | |
| 8 | 17.911 | 10.400 | 1.43985 | 94.49 |
| 9 | −13.820 | 2.500 | 1.75844 | 52.08 |
| 10 | −24.234 | 0.100 | | |
| 11 | 16.078 | 2.470 | 1.71616 | 53.61 |
| 12 | 11.713 | 12.520 | 1.43985 | 94.49 |
| 13 | 21.287 | 3.300 | | |
| 14 | −73.918 | 7.000 | 1.48794 | 84.07 |
| 15 | −10.820 | 2.000 | 1.75844 | 52.08 |
| 16 | −18.171 | | | | with the following design data of the tube lens unit TLU indicating the radii of curvature r1 to r8 in mm, the thicknesses or air gaps d0 to d8 in mm, the refractive indices ne and the Abbe number $v_e$:

| Area FL | Radius of curvature r1-r8 (mm) | Thickness d0-d8 (mm) | Refractive index $n_e$ | Abbe number $v_e$ |
|---|---|---|---|---|
| | | 113.400 | | |
| 1 | 101.451 | 6.700 | 1.60520 | 65.15 |
| 2 | −42.169 | 2.800 | 1.72539 | 34.47 |
| 3 | 90.276 | 32.605 | | |
| 4 | 344.713 | 9.910 | 1.67718 | 37.90 |
| 5 | −51.212 | 2.500 | 1.55440 | 63.23 |
| 6 | −109.028 | 47.000 | | |
| 7 | infinite | 30.000 | 1.51872 | 63.96 |
| 8 | infinite | 119.758 | | |
| 9 | Intermediate image plane | | | |

Figure 3:
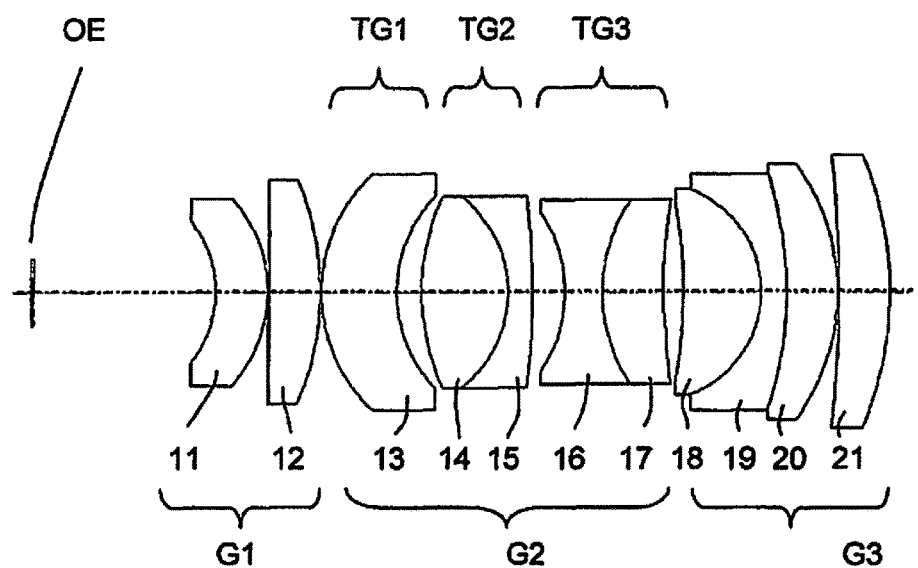
FIG. 3 shows a schematic representation of the sub-systems according to a second embodiment.

FIG. 3 shows the lens arrangement of the three optical sub-systems according to a second embodiment, viewed from the object plane OE with the sub-systems G1, G2 and G3, wherein the sub-system 2 consists of the elements TG1, TG2 and T3. The first sub-system G1 consists of a meniscus 11 and a convergent lens 12, wherein the meniscus 11 is curved towards the object plane OE.

The second sub-system G2 consists of three elements TG1, TG2 and TG3, wherein the first element TG1 is characterized by a meniscus 13 made of a lanthanum glass. The second convergent element of the second sub-system G2 is designed as a cemented element consisting of a convergent lens 14 made of Fluorkron glass or CaF$_2$ and a diverging lens 15 made of a highly refractive lanthanum or short flint glass. Furthermore the third element TG3 of the second sub-system G2 consists of a strongly scattering cemented element with the lenses 16 and 17, wherein the lens 17 is made of a lanthanum glass.

Figure 4:
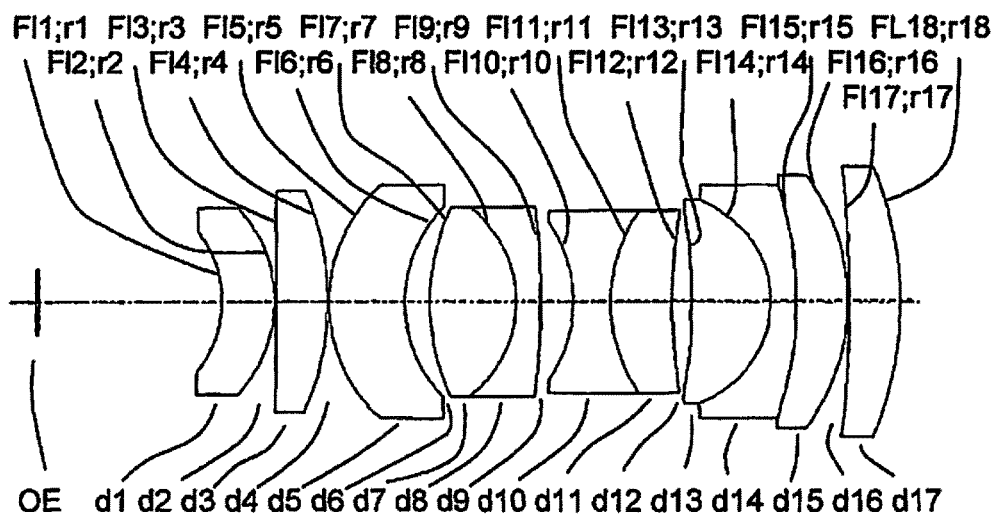
FIG. 4 shows a representation of the microscope objective according to FIG. 3 with the design data references for the thicknesses or air gaps as well as the radii and areas of the individual lenses.

The third sub-system G3 is characterized by a cemented element with convergent lenses 18, 19 and 20 and a lens 21 made of a Fluorkron glass. The thicknesses or the air gaps d1 to d17, the radii of curvature r1 to r18 and the areas F11 to FL16 of the individual lenses 11 to 21 are indicated in FIG. 4.

The following table shows the embodiment 2 with the radii of curvature r1 to r18 in mm, the thicknesses or air gaps d1 to d17 in mm, the refractive indices ne, the Abbe numbers $v_e$ at a magnification of 5.88, a numerical aperture of 0.36, a cover glass thickness of 0.17 mm, a working distance of 5.84 mm and an image diameter of 26.00 mm:

| Area FL | Radius of curvature r1-r18 (mm) | Thickness d1-d17 (mm) | Refractive index $n_e$ | Abbe number $v_e$ |
|---|---|---|---|---|
| 1 | −8.993 | 4.000 | 1.49960 | 66.78 |
| 2 | −11.020 | 0.100 | | |
| 3 | 2208.291 | 4.000 | 1.59446 | 68.00 |
| 4 | −22.449 | 0.100 | | |
| 5 | 12.437 | 6.000 | 1.82017 | 46.37 |
| 6 | 10.587 | 2.000 | | |
| 7 | 17.317 | 7.000 | 1.59446 | 68.00 |
| 8 | −9.286 | 2.000 | 1.64132 | 42.20 |
| 9 | −60.781 | 2.600 | | |
| 10 | −10.799 | 3.000 | 1.61664 | 44.27 |
| 11 | 12.531 | 4.800 | 1.77621 | 49.36 |
| 12 | 45.035 | 1.500 | | |
| 13 | −41.795 | 6.000 | 1.43985 | 94.49 |
| 14 | −8.636 | 2.000 | 1.64132 | 42.20 |
| 15 | −30.473 | 4.000 | 1.59667 | 35.03 |
| 16 | −16.944 | 0.100 | | |
| 17 | −98.743 | 4.000 | 1.43985 | 94.49 |
| 18 | −27.406 | | | | with the following design data of the tube lens unit TLU indicating the radii r1 to r8 in mm, the thicknesses or air gaps d0 to d8 in mm, the refractive indices ne and the Abbe number $v_e$:

| Area FL | Radius of curvature r1-r8 (mm) | Thickness d1-d8 (mm) | Refractive index $n_e$ | Abbe number $v_e$ |
|---|---|---|---|---|
| | | 114.400 | | |
| 1 | 101.451 | 6.700 | 1.60520 | 65.15 |
| 2 | −42.169 | 2.800 | 1.72539 | 34.47 |
| 3 | 90.276 | 32.605 | | |
| 4 | 344.713 | 9.910 | 1.67718 | 37.90 |
| 5 | −51.212 | 2.500 | 1.55440 | 63.23 |
| 6 | −109.028 | 47.000 | | |
| 7 | infinite | 30.000 | 1.51872 | 63.96 |
| 8 | infinite | 119.758 | | |
| 9 | Intermediate image plane | | | |

What is claimed is:
1. An apochromatic microscope objective, comprising three optical sub-systems, wherein starting from the object plane:
   a first one of the optical sub-systems includes a meniscus disposed immediately adjacent the object plane, and a convergent lens, wherein the meniscus is curved towards the object plane;
   a second one of the optical sub-systems consists of:
      a first element including a meniscus or a double-cemented element;
      a second element configured as a collecting cemented element; and
      a third element comprising a cemented element, wherein either the first element or the third element is strongly scattering, each one of the second element and the third element being double-cemented; and
   a third one of the optical sub-systems has at least one cemented element with a collecting lens, wherein the objective has the following design data with the radii of curvature r1 to r16 in mm, the thicknesses or air gaps d1 to d15 in mm, the refractive indices ne, the Abbe numbers $v_e$ at a magnification of 5.88, a numerical aperture of 0.4, a cover glass thickness of 0.17 mm, a working distance of 5.84 mm and an image diameter of 26.00 mm:

| Surface FL | Radius of curvature r1-r16 (mm) | Thickness d1-d15 (mm) | Refractive index $n_e$ | Abbe number $v_e$ |
|---|---|---|---|---|
| 1 | −7.717 | 7.970 | 1.88815 | 40.52 |
| 2 | −10.745 | 1.507 | | |
| 3 | 38.680 | 3.960 | 1.59446 | 68.00 |
| 4 | −22.386 | 0.920 | | |
| 5 | −17.277 | 2.700 | 1.62033 | 63.10 |
| 6 | 10.984 | 3.200 | 1.72539 | 34.47 |
| 7 | 15.962 | 2.020 | | |
| 8 | 17.911 | 10.400 | 1.43985 | 94.49 |
| 9 | −13.820 | 2.500 | 1.75844 | 52.08 |
| 10 | −24.234 | 0.100 | | |
| 11 | 16.078 | 2.470 | 1.71616 | 53.61 |
| 12 | 11.713 | 12.520 | 1.43985 | 94.49 |
| 13 | 21.287 | 3.300 | | |
| — | −73.918 | 7.000 | 1.48794 | 84.07 |
| 15 | −10.820 | 2.000 | 1.75844 | 52.08 |
| 16 | −18.171 | | | | with the following design data of a tube lens unit indicating the radii r1 to r8 in mm, the thicknesses or air gaps d0 to d8 in mm, the refractive indices ne and the Abbe number $v_e$:

| Area FL | Radius of curvature r1-r8 (mm) | Thickness d0-d8 (mm) | Refractive index $n_e$ | Abbe number $v_e$ |
|---|---|---|---|---|
| | | 113.400 | | |
| 1 | 101.451 | 6.700 | 1.60520 | 65.15 |
| 2 | −42.169 | 2.800 | 1.72539 | 34.47 |
| 3 | 90.276 | 32.605 | | |
| 4 | 344.713 | 9.910 | 1.67718 | 37.90 |
| 5 | −51.212 | 2.500 | 1.55440 | 63.23 |
| 6 | −109.028 | 47.000 | | |
| 7 | infinite | 30.000 | 1.51872 | 63.96 |
| 8 | infinite | 119.758 | | |
| 9 | Intermediate image plane. | | | |

2. The apochromatic microscope objective according to claim 1, wherein the convergent lens of the first one of the optical sub-systems is made of a Fluorkron glass.

3. The apochromatic microscope objective according to claim 1, wherein the first element of the second one of the optical sub-systems is a meniscus formed from highly refractive lanthanum glass.

4. The apochromatic microscope objective according to claim 1, wherein the first element of the second one of the optical sub-systems is a cemented element with at least one lens made of a short flint glass.

5. The apochromatic microscope objective according to claim 1, wherein the second element of the second one of the optical sub-systems includes a convergent lens made of Fluorkron glass or $CaF_2$ and a diverging lens made of a highly refractive lanthanum or short flint glass.

6. The apochromatic microscope objective according to claim 1, wherein the cemented element of the third element of the second one of the optical sub-systems has a lens made of a lanthanum glass.

7. The apochromatic microscope objective according to claim 1, wherein a convergent lens of the third one of the optical sub-systems is made of Fluorkron glass or $CaF_2$.

8. An apochromatic microscope objective, comprising three optical sub-systems, wherein starting from the object plane:
a first one of the optical sub-systems includes a meniscus disposed immediately adjacent the object plane, and a convergent lens, wherein the meniscus is curved towards the object plane;
a second one of the optical sub-systems consists of:
a first element including a meniscus or a double-cemented element;
a second element configured as a collecting cemented element; and
a third element comprising a cemented element, wherein either the first element or the third element is strongly scattering, each one of the second element and the third element being double-cemented; and
a third one of the optical sub-systems has at least one cemented element with a collecting lens, wherein the objective has the following design data with the radii of curvature r1 to r18 in mm, the thicknesses or air gaps d1 to d17 in mm, the refractive indices ne, the Abbe numbers $v_e$ at a magnification of 5.88, a numerical aperture of 0.36, a cover glass thickness of 0.17 mm, a working distance of 14.24 mm and an image diameter of 26.00 mm:

| Area FL | Radius of curvature r1-r18 (mm) | Thickness d1-d17 (mm) | Refractive index $n_e$ | Abbe number $v_e$ |
|---|---|---|---|---|
| 1 | −8.993 | 4.000 | 1.49960 | 66.78 |
| 2 | −11.020 | 0.100 | | |
| 3 | 2208.291 | 4.000 | 1.59446 | 68.00 |
| 4 | −22.449 | 0.100 | | |
| 5 | 12.437 | 6.000 | 1.82017 | 46.37 |
| 6 | 10.587 | 2.000 | | |
| 7 | 17.317 | 7.000 | 1.59446 | 68.00 |
| 8 | −9.286 | 2.000 | 1.64132 | 42.20 |
| 9 | −60.781 | 2.600 | | |
| 10 | −10.799 | 3.000 | 1.61664 | 44.27 |
| 11 | 12.531 | 4.800 | 1.77621 | 49.36 |
| 12 | 45.035 | 1.500 | | |
| 13 | −41.795 | 6.000 | 1.43985 | 94.49 |
| 14 | −8.636 | 2.000 | 1.64132 | 42.20 |
| 15 | −30.473 | 4.000 | 1.59667 | 35.03 |
| 16 | −16.944 | 0.100 | | |
| 17 | −98.743 | 4.000 | 1.43985 | 94.49 |
| 18 | −27.406 | | | | with the following design data of a tube lens unit indicating the radii r1 to r8 in mm, the thicknesses or air gaps d0 to d8 in mm, the refractive indices ne and the Abbe number $v_e$:

| Area FL | Radius of curvature r1-r8 (mm) | Thickness d1-d8 (mm) | Refractive index $n_e$ | Abbe number $v_e$ |
|---|---|---|---|---|
| | | 114.400 | | |
| 1 | 101.451 | 6.700 | 1.60520 | 65.15 |
| 2 | −42.169 | 2.800 | 1.72539 | 34.47 |
| 3 | 90.276 | 32.605 | | |
| 4 | 344.713 | 9.910 | 1.67718 | 37.90 |
| 5 | −51.212 | 2.500 | 1.55440 | 63.23 |
| 6 | −109.028 | 47.000 | | |
| 7 | infinite | 30.000 | 1.51872 | 63.96 |
| 8 | infinite | 119.758 | | |
| 9 | Intermediate image plane. | | | |

9. The apochromatic microscope objective according to claim 8, wherein the convergent lens of the first one of the optical sub-systems is made of a Fluorkron glass.

10. The apochromatic microscope objective according to claim 8, wherein the first element of the second one of the optical sub-systems is a meniscus formed from highly refractive lanthanum glass.

11. The apochromatic microscope objective according to claim 8, wherein the first element of the second one of the optical sub-systems is a cemented element with at least one lens made of a short flint glass.

12. The apochromatic microscope objective according to claim 8, wherein the second element of the second one of the optical sub-systems includes a convergent lens made of Fluorkron glass or $CaF_2$ and a diverging lens made of a highly refractive lanthanum or short flint glass.

13. The apochromatic microscope objective according to claim 8, wherein the cemented element of the third element of the second one of the optical sub-systems has a lens made of a lanthanum glass.

14. The apochromatic microscope objective according to claim 8, wherein a convergent lens of the third one of the optical sub-systems is made of Fluorkron glass or $CaF_2$.

* * * * *